THIN FILM MAGNETIC MEMORY

Original Filed Nov. 27, 1959 3 Sheets-Sheet 1

Leo M. Piecha,
INVENTOR.

BY.

[signature]

AGENT.

Leo M. Piecha,
INVENTOR.
BY.
Ernest F. Oberheim
AGENT.

THIN FILM MAGNETIC MEMORY

Leo M. Piecha,
INVENTOR.
BY.
Ernest F. Oberlin
AGENT.

United States Patent Office 3,218,617
Patented Nov. 16, 1965

3,218,617
THIN FILM MAGNETIC MEMORY

Leo M. Piecha, Sierra Vista, Ariz., assignor to Hughes Aircraft Company, Culver City, Calif., a corporation of Delaware Continuation of application Ser. No. 855,723, Nov. 27, 1959. This application Feb. 10, 1965, Ser. No. 434,172
12 Claims. (Cl. 340—174)

This is a continuation of application Serial No. 855,723, now abandoned.

This invention relates to magnetic information storage devices and more particularly to storage elements comprising a plurality of thin film layers for providing a nondestructive readout magnetic memory element.

It has long been recognized that effective miniaturization could be achieved if electronic components could be formed by vacuum deposition manufacturing techniques. In complex devices such as digital computers, for example, such structures would be extremely useful since this method of manufacture would enable large numbers of components and circuits to be deposited simultaneously. Additionally, it should be expected that reduction in size of the components will reduce operating power requirements.

The storing of binary information is a basic problem in the electronic art, particularly in the design of digital computers and many other devices. Information has long been stored by letting the magnetic states of a medium represent desired information. Examples of such storage are the well-known magnetic drum or tape recording techniques and the equally well-known magnetic core devices. However, such devices, while satisfactory from an operational point of view in many applications, are not conveniently applicable to high-speed miniaturized computer systems because they are relatively large in size, require relatively large amounts of power for operation, are not well suited to mass production techniques, and in many cases are not well adapted to extremely fast operation. In addition, magnetic core devices, while yielding instantaneous access to stored information, as distinguished from magnetic recording techniques, do not readily provide non-destructive readout, in that the act of reading stored information destroys such information.

It is, accordingly, an object of this invention to provide a novel magnetic device having faster operation than conventional magnetic devices.

Another object of this invention is to provide a novel magnetic device requiring relatively little power for operation.

Still another object of this invention is to provide a magnetic device constructed of thin film and adapted to mass production techniques such as vacuum deposition.

A further object of this invention is to provide a novel and magnetic device of extremely small size.

A still further object of this invention is to provide a novel magnetic memory element affording relatively instantaneous access to information stored therein.

Another and further object of this invention is to provide a novel magnetic memory element affording nondestructive readout.

This invention provides means for storing discrete electrical signals representing binary information in a suitable material and can be adapted to provide a magnetic storage element not subject to the limitations mentioned above. Briefly described, the invention comprises a pair of magnetic strips or sheets having an associated pair of conductors for each binary bit to be recorded thereon. Recording is accomplished by supplying electrical current to the conductors such that magnetization of the first strip in a first direction is produced to represent a binary "one" and magnetization of the second strip in a second direction is produced to represent a binary "zero."

Reading, according to one embodiment of this invention, is accomplished by passing an electrical current through both strips simultaneously. This will produce an output pulse of a first direction on one associated conductor if a binary "one" is sensed and an output pulse of a second direction on the conductor if a binary "zero" is sensed.

Further and additonal objects and advantages will become apparent hereinafter during the detailed description of an embodiment of the invention illustrated by way of example in the accompanying drawings in which:

FIGS. 1*a* and 1*b* show a pair of thin film strips of magnetic material and their associated conductors with "write" pulses applied to the conductors and magnetized in differing magnetic senses;

FIGS. 2*a* and 2*b* show a pair of thin film strips of magnetic material and their associated conductors as in FIGS. 1*a* and 1*b* with a "read" pulse applied to said magnetic strips;

FIGS. 3*a* and 3*b* show a pair of thin film strips of magnetic material and their associated conductors with the electrical output indicated;

In all of the descriptions of the operation of the magnetic devices which follow, it is to be understood that, while the explanations given appear to be reasonably and qualitatively correct, the description of magnetization phenomena is highly simplified for the purpose of clarity in explanation. In actuality, magnetic domain formation and interaction is known to be extremely complex and the simple explanations offered herein may not fully describe the theory of operation of this invention. It should be further understood that the theory of operation herein offered is merely supplied for explanatory purposes and that the utility of the invention does not depend upon the accuracy of the principles of operation suggested. Accordingly, while one plausible theoretical explanation is offered, other equally plausible theories may exist, and the applicant does not wish to be limited to any particular theory.

Figure 1A:
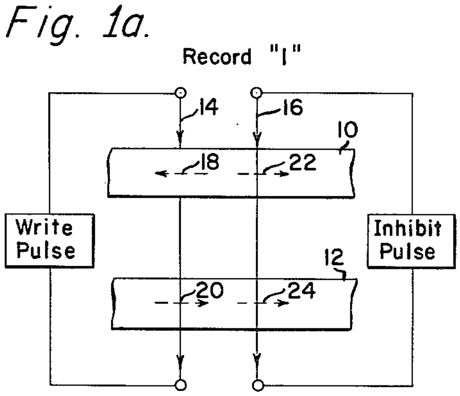
Figure 1B:
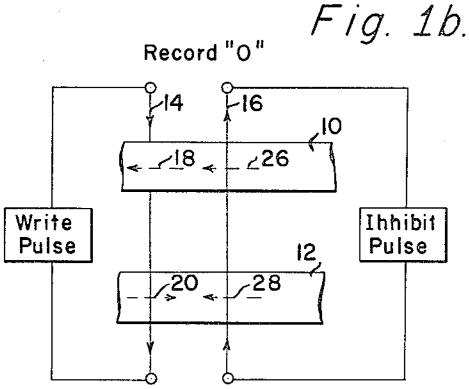

Turning now to FIGS. 1*a* and 1*b*, there is shown a pair of thin film strips 10 and 12 of magnetic material For the proper operation of this invention, these thin film strips 10 and 12 must be anisotropic, i.e., each of the strips must have a preferred axis of magnetization along the length of the strip. Such anisotropy can be produced by various techniques. A suggested technique will be discussed below in connection with the description of the details of an embodiment of this invention. Associated with the pair of magnetic strips 10 and 12 is a pair of conductors 14 and 16. Although the conductors 14 and 16 are shown in juxtaposed shape, it should be understood that in an actual embodiment of this invention the conductors 14 and 16 are preferably superimposed.

FIGS. 1*a* and 1*b* show the direction of the currents which are applied to the respective conductors to record binary information. FIG. 1*a* shows the relating directions of currents which will magnetize the magnetic strips 10 and 12 in a sense to record a binary "one," and, FIG. 1*b* shows the relating directions of the currents which will magnetize the magnetic strips 10 and 12 in a sense to record a binary "zero." When recording either a "one" or a "zero," current is applied to the conductor 14 in the direction shown in FIGS. 1*a* and 1*b*. This current produces magnetic fields in the magnetic strips 10 and 12 as shown by the dotted arrows 18 and 20. Simultaneously, with the application of current to the conductor 14, called the "write" winding, current is applied to the conductor 16, called the "inhibit" winding, in the direction shown in FIG. 1*a* to record a binary "one" and in the direction shown in FIG. 1*b* to record a binary "zero." The passage of current through the conductor 16 can be seen to create magnetic fields in the magnetic strips 10 and 12 as shown by the dotted arrows 22 and 24 in FIG. 1*a* and by the dotted arrows 26 and 28 in FIG. 1*b*.

Figure 2A:
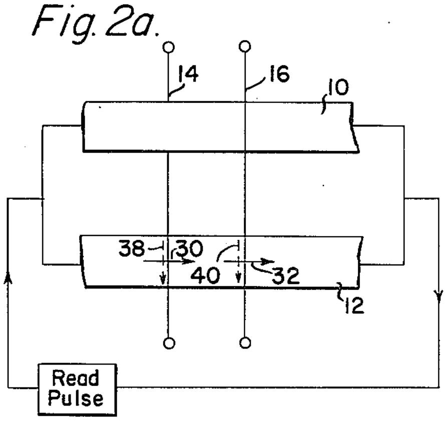

Referring now to FIG. 1*a*, it can be seen that the dotted arrows 18 and 22 representing the magnetic fields induced in the magnetic strip 10 are opposite in direction. Providing that the electric currents producing the magnetic fields are equal, in theory, equal and opposite magnetic fields will be created in the magnetic strip 10 at the same point, since the conductors 14 and 16 are actually superimposed. The effect of the application of equal and opposite magnetic fields to the magnetic strip 10 will be that no effective resulting magnetization of the strip is produced. However, it can be seen that the magnetic fields produced in the magnetic strip 12, as shown by the dotted arrows 20 and 24, are in the same direction. Thus, the magnetic strip 12 will be magnetized in the direction of the magnetic fields applied to it. This resultant magnetization of the magnetic strip 12 is shown in FIG. 2*a* by the solid arrows 30 and 32.

Figure 2B:
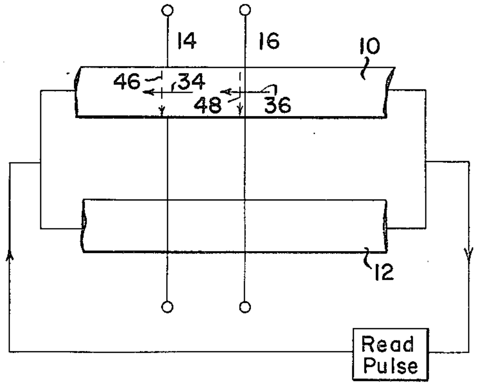

Referring now to FIG. 1*b*, it can be seen that the dotted arrows 18 and 26, indicating superimposed like-directed magnetic fields, will produce a magnetization of the magnetic strip 10 as shown by the solid arrows 34 and 36 in FIG. 2*b*. The dotted arrows 20 and 28, representing the magnetic fields applied to the magnetic strip 12, will not effectively magnetize the magnetic strip 12 since the magnetic fields are equal in magnitude and opposite in direction.

There has thus been produced a portion of the magnetic strip 12 magnetized in a first direction (shown to the right in FIG. 2*a*) when a binary "one" is recorded. Similarly, there has been produced in the magnetic strip 10, as seen in FIG. 2*b*, a portion magnetized in the opposite direction when a binary "zero" has been recorded. It should be noted that in both cases the direction of magnetization lies along the axis or the line of anisotropy.

The reading of information will be described with reference to FIGS. 2*a*, 2*b*, 3*a*, and 3*b*. Referring to FIG. 2*a*, a "read" pulse is applied to the magnetic strips 10 and 12. Since magnetic materials are generally electrical conductors, the occurrence of such a pulse will produce magnetic fields surrounding the magnetic strips. It has been observed that a magnetic field exists within the magnetic strips as well. This magnetic field is shown by the dotted arrows 38 and 40. Since the magnetic strip 12 has an initial magnetization shown by the solid arrows 30 and 32, the application of a magnetic field will cause a rotation of the direction of magnetization of the magnetic strip 12. The amount of rotation which will be produced depends upon the energy contained in the applied "read" pulse, and thus, by controlling both the size and duration of this pulse, this rotation can be controlled.

Figure 3A:
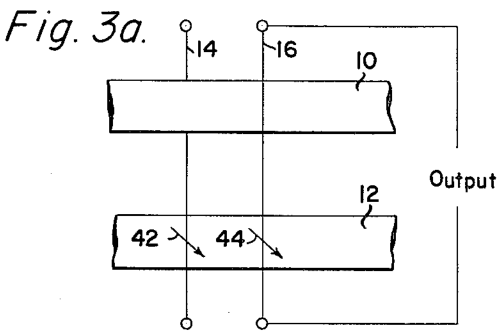
Figure 3B:
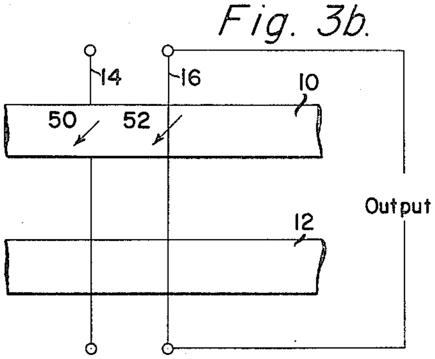
Figure 6:
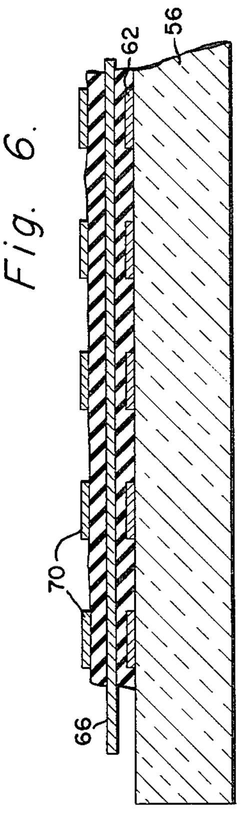
FIG. 6 is an idealized, enlarged vertical sectional view taken along the line 6—6 of FIG. 4.
Figure 4:
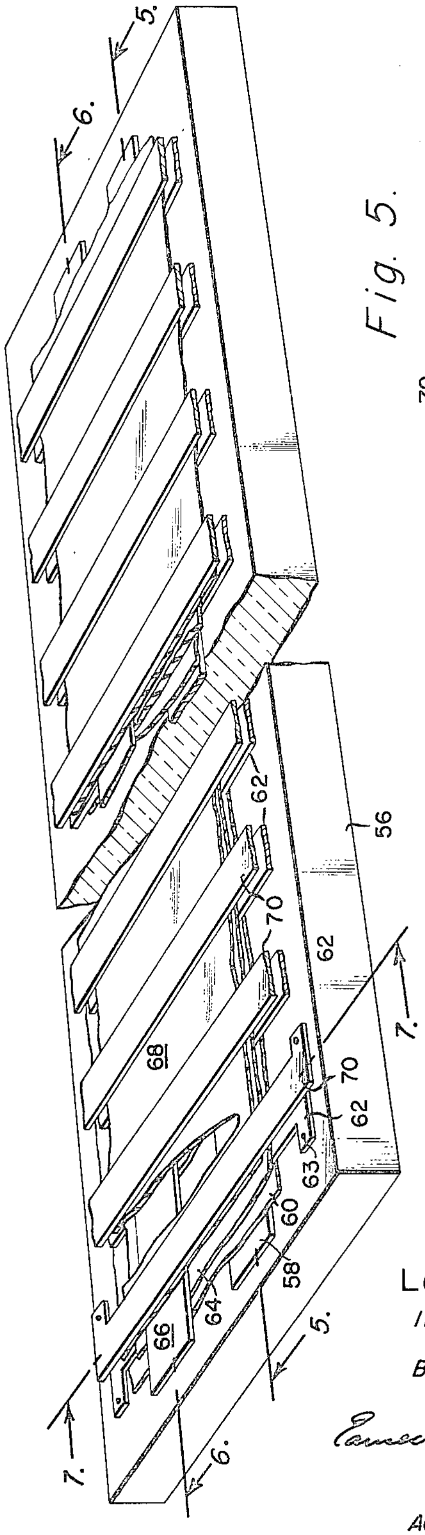
FIG. 4 is a distorted and enlarged perspective view of a magnetic memory element constructed in accordance with the principles of this invention.
Figure 5:
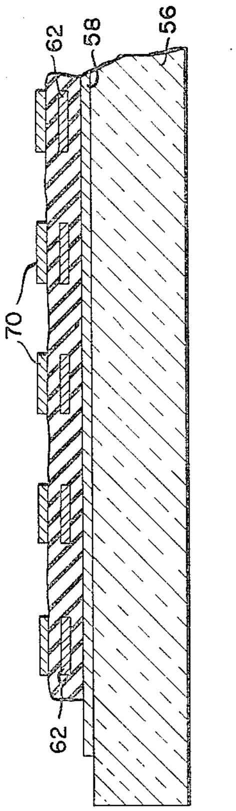
FIG. 5 is an idealized, enlarged vertical sectional view taken along the line 5—5 of FIG. 4.

FIG. 3*a* shows the rotated magnetic field in the magnetic strip 12 as solid arrows 42 and 44. If, now, an output device is connected across the conductor 16, an electrical voltage will be induced in the conductor 16 by the rotation of the magnetic field in the magnetic strip 12. FIGS. 2*a* and 3*a* show that, for the example shown, this rotation is in a clockwise direction, and will produce an output pulse of a first polarity. Little or no output should result from the application of the "read" pulse to the magnetic strip 10, since the magnetic strip 10 has no initial state of magnetization.

If the width of the magnetic strips 10 and 12 is sufficiently small, such that magnetization in the direction shown by the solid arrows 42 and 44 in FIG. 3*a* tends to produce an inherently unstable magnetic domain and if the magnetic strips 10 and 12 have sufficient anisotropic character when the "read" pulse is removed, the direction of magnetization will tend to snap-back from the direction shown by the solid arrows 42 and 44 to the direction shown by the solid arrows 30 and 32, if the angular displacement is not too great. This critical width, i.e., that width below which the above-described snap-back will occur, is dependent upon the particular magnetic material used and upon the thickness of the magnetic strips. Such a device produces a nondestructive magnetic readout since the direction of magnetization is the same before and after the application of the "read" pulse.

Referring to FIG. 2*b*, we note that the magnetic strip 10 has been magnetized in the direction shown by the solid arrows 34 and 36, which is opposite to the direction of the solid arrows 30 and 32 in FIG. 2*a*. Applying an exactly similar "read" pulse to the magnetic strips 10 and 12 produces a magnetic field shown by the dotted arrows 46 and 48 which, in turn, produces a rotation from the direction of magnetization shown by the solid arrows 46 and 48 to the direction of magnetization shown by the solid arrows 50 and 52 in FIG. 3*b*. Here, the direction of rotation can be seen to be counterclockwise and an output pulse of opposite polarity to said first polarity will be produced in the conductor 16 in FIG. 3*b*. The considerations described above indicate the conditions which must exist to make the readout nondestructive.

It has been shown that the application of a "read" pulse to the magnetic strips 10 and 12 at the time the magnetic state represents a recorded binary "one," produces an output pulse of a first polarity and the application of the "read" pulse when the magnetic state represents a recorded binary "zero," produces an output pulse of a second polarity. It has also been shown that proper choice of readout pulse, magnetic strip properties and geometry of the arrangement make the device shown capable of nondestructive magnetic readout.

If the resistivity of the magnetic strips should prove to be higher than is practical to use in a desired situation, an electrical conductor, suitably insulated from the magnetic strips, could be superimposed upon each of the strips without change in the operation of the invention. In such a case, the "read" pulse would be applied to the electrical conductors.

If a nondestructive magnetic readout is not desired, control of the properties and geometry of the magnetic strips is not required, nor is the control of the amount of energy contained in a "read" pulse necessary.

A memory device utilizing the principles and the basic construction shown in FIGS. 1*a*, 1*b*, 2*a*, 2*b*, 3*a*, and 3*b*, is shown in FIGS. 4–7. This device shows a plurality of binary information magnetic memory cells. Each of said plurality being constructed in accordance with FIGS. 1*a*, 1*b*, 2*a*, 2*b*, 3*a*, and 3*b*.

The device shown in FIGS. 4–7 may be manufactured by successive applications of the vacuum deposition technique in which each of the respective magnetic, insulative, and conductive layers shown in FIGS. 4–7 are superimposed in an appropriate order.

Investigations have been conducted into the magnetic behaviour of ferromagnetic films deposited on substrates. One such investigation is reported in the Journal of Applied Physics, volume 26, August 1955, and is entitled "Preparation of Thin Magnetic Films and Their Properties" by M. S. Blois, Jr., at pages 975 through 980.

In the device of FIGS. 4–7 the magnetic layers may be composed of permalloy material and have a thickness of approximately 6,000 A. (Angstroms). The conductive layers may be composed of aluminum, and the insulative layers of silicon monoxide. The thickness of the conductive and insulative layers may be approximately 10,000 A.

The thickness of the magnetic film layer is governed at the lower limit by the disappearance of ferromagnetic properties while the appearance of significant eddy-current losses at the relatively high frequencies used in digital computing devices governs the upper limit of said thickness for optimum performance.

Since the entire structure of the memory element is composed of thin films, a carrier or substrate 56 is required. The choice of a suitable substrate is made according to the considerations referred to in the beforementioned Blois article. For the purposes of this invention a suitable substrate has been found to be a commercially available soft glass which is an insulative medium as required. However, other insulating materials able to withstand higher temperatures may be used.

Upon the substrate 56 there is deposited a plurality of conducting, insulating and magnetic layers which will be described in detail below.

The first layer to be deposited is a magnetic layer 58, rectangular in shape and extending along the length of the memory element. One method for producing the necessary anisotropy in this magnetic layer 58 is to deposit the magnetic layer in a magnetic field. The direction of the magnetic field will control the axis of magnetic preference or anisotropy. The ends of the magnetic layer 58 are adapted to receive electrical connections. Above the magnetic layer 58 is deposited an insulating layer 60. The insulating layer 60 must have a size and shape which prevents electrical contact between the magnetic layer 58 and the various conducting and magnetic layers which will be superimposed thereupon.

Above the insulating layer 60 is deposited a plurality of separate conducting segments 62. Each of these segments is provided with tab portions 63 at its ends only one of which is shown; said tab portions being suitable for electrical connection thereto.

An insulating layer 64 is deposited over the conducting segments 62 and is of a size and shape which prevents electrical contact between the segments 62 and various superimposed layers.

Above the insulating layer 64 is deposited a magnetic layer 66, similar in size and shape to the magnetic layer 58 and displaced laterally therefrom. The layer 66 can be given the necessary anisotropic character by the technique described above. The ends of the magnetic layer 66 are adapted to receive electrical connections.

Insulating layer 68 is deposited above the magnetic layer 66 to prevent electrical contact between the magnetic layer 66 and various superimposed layers.

Conducting segments 70 are deposited on insulating layer 68 in positions respectively above conducting segments 62.

The operation of the memory element shown in FIGS. 4–7 is precisely as described with reference to FIGS. 1*a*, 1*b*, 2*a*, 2*b*, 3*a*, and 3*b*. However, the magnetic layers 58 and 66 of FIGS. 4–7 are elongated and provided with a plurality of pairs of electrical conductors. Thus, as many binary bits can be stored in the magnetic layers 58 and 66 as there are provided pairs of electrical conductors 62 and 70.

It can be seen that when a "read" pulse is introduced across the layers 58 and 66, each of the binary bits stored in the magnetic layers 58 and 66 will be read simultaneously. Thus, an entire "word" of binary information can be read in parallel fashion. Such parallel operation is useful in providing "word-organized" memories in which an entire word of binary information is selected rather than a particular bit. Further details of the operation of the device of FIGS. 4–7 will become apparent during the description of the associated circuitry shown in FIGS. 8–9.

Figure 8:
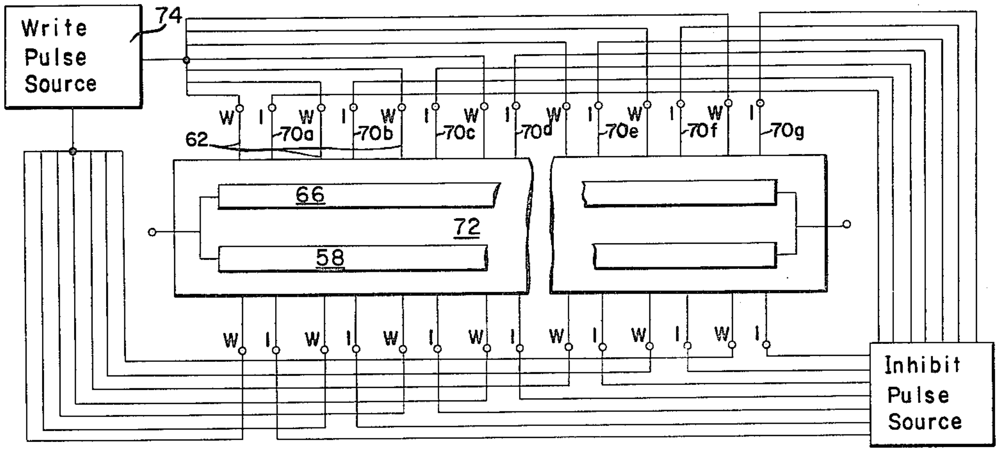
FIG. 8 is a circuit diagram showing schematically the device of FIGS. 4–7 connected in a "write" circuit configuration.

FIG. 8 is a diagram showing the memory element now designated 72 of FIGS. 4–7 connected to perform the "write" operation. The "write" pulse source 74 is shown connected in parallel to a plurality of "write" conductors 62. "Write" pulses are applied to each of the "write" conductors 62 simultaneously to provide parallel "write" operation. However, it is evident that if it is desired to write in any selected memory bit, appropriate selection circuitry can be provided for this purpose. An inhibit pulse source is shown connected to inhibit conductors 70*a*, 70*b*, 70*c*, 70*d*, 70*e*, 70*f*, 70*g* by separate pairs of wires. The polarity of the pulse applied to a particular inhibit winding, such as 70*a* will control whether a "one" or a "zero" is to be recorded. It is evident that inhibit pulses may be applied, either simultaneously to obtain a parallel "write" operation, or to any selected memory bit as above.

Figure 9:
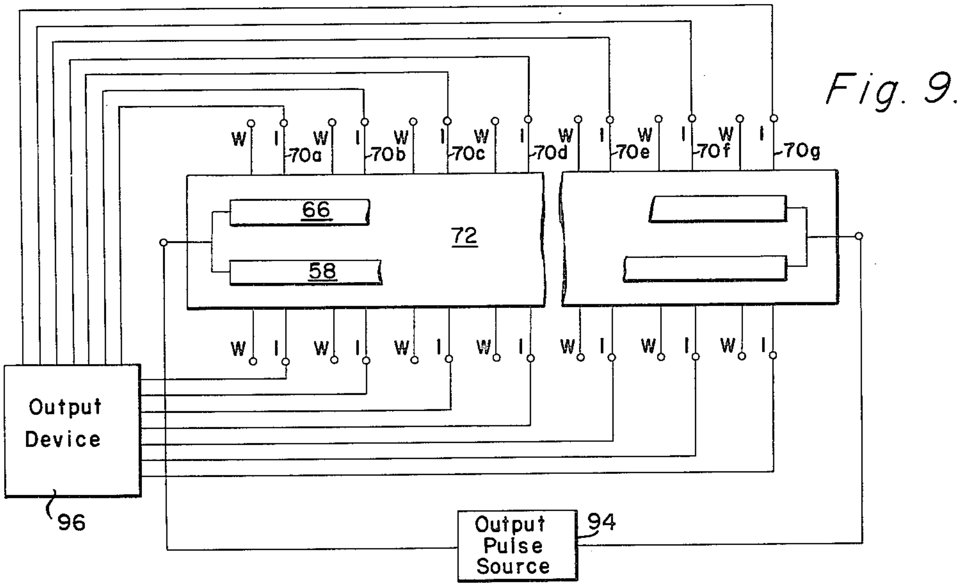
FIG. 9 is a circuit diagram showing schematically the device of FIGS. 4–7 connected in a "read" circuit configuration.
Figure 7:
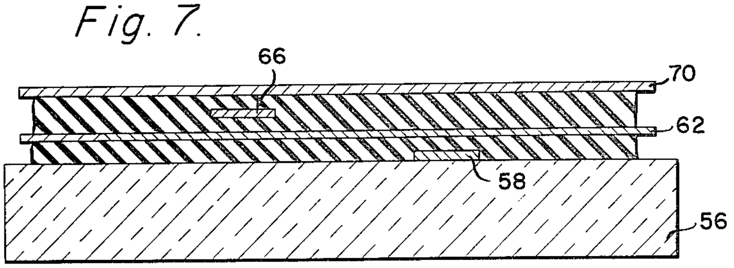
FIG. 7 is an idealized, enlarged vertical sectional view taken along the line 7—7 of FIG. 4.

FIG. 9 shows the memory element 72 connected to perform the read operation. An output pulse source 94 is shown connected to the memory element 72. As has been described above, this connection will introduce an output pulse across the magnetic strips 58 and 66 described in connection with the description of FIGS. 4–7. An output device 96 is shown connected across the inhibit conductors, 70*a*, 70*b*, 70*c*, 70*d*, 70*e*, 70*f*, and 70*g* by separate pairs of wires. This output device 96 will receive simultaneously a signal from each of the inhibit conductors, such as 70*a*, and will either record or display the pulse received from each memory bit location.

It can be seen then that although the "write" operation can be conducted in either serial or parallel form, the read operation is inherently parallel in nature.

The vacuum evaporation technique employed in constructing this novel magnetic element is conventional and well-known in the art. Suffice it to say for the purposes of this invention that the magnetic element may be built up by the sequential evaporation of each thin film layer by means of an individual mask having the configuration of the desired layer to be deposited. However, thin film devices may also be produced by other techniques than vacuum deposition. For example, the required configurations of conducting, insulating, and magnetic films may be produced by such processes or combinations of processes as electrodeposition, electrophoresis, silk screening techniques, or various inking, sketching, and printing techniques which allow thin planes of materials to be defined, registered, and applied upon a sub-surface.

It should be noted that the dimensions given hereinabove for the various thin film layers are not to be construed as limited thereto but are merely indicative of a preferable structure compatible with thin film considerations. The order of depositing the various conductive layers may also be varied from the order described.

It will now be appreciated that a novel and improved thin film magnetic memory element has been disclosed. This element is particularly adapted to provide a "word-organized" memory of improved characteristics.

What is claimed is:

1. A magnetic device comprising first and second thin film strips of antisotropic magnetic material, said strips each having a preferred axis of magnetization substantially paralleling the length of the strip, a first electrical conductor magnetically coupled to said first strip in a first magnetic sense and to said second strip in an opposite magnetic sense, a second electrical conductor magnetically coupled to said first and second strips in the same magnetic sense, magnetizing pulse source means coupled to said first and second electrical conductors to simultaneously apply electrical pulses thereto producing magnetization of said magnetic strips in accordance therewith, and read pulse source means coupled to said strips to produce current therein after operation of said magnetic pulse source means.

2. A magnetic device comprising first and second thin film strips of anisotropic magnetic material, said strips each having a preferred axis of magnetization substantially paralleling the length of the strip, a first electrical conductor magnetically coupled to said first strip in a first magnetic sense and to said second strip in an opposite magnetic sense, a second electrical conductor magnetically coupled to said first and second strips in said first magnetic sense, magnetic pulse source means coupled to said first and second electrical conductors to simultaneously apply electrical pulses thereto producing magnetization of said magnetic strips in accordance therewith, and read pulse source means coupled to said strips to produce current therein after operation of said magnetic pulse source means.

3. A magnetic device comprising first and second thin film strips of anisotropic magnetic material, said strips being adapted to receive electrical "read" pulses and to provide electrical signals in accordance with the states of magnetization of said strips in response to said "read" pulses, each strip having a preferred axis of magnetization substantially paralleling the length of the strip, a source of electrical "read" pulses coupled to said strips to produce electric current therein, a first electrical conductor magnetically coupled to said first strip in a first magnetic sense and to said second strip in an opposite magnetic sense and adapted to receive electrical pulses and to produce a first magnetic field in accordance with said pulses, a second electrical conductor magnetically coupled to said first and second magnetic strips in said first magnetic sense and adapted to receive electrical pulses and to produce a second magnetic field in accordance with said pulses, said magnetic strips being responsive to said magnetic fields of said first and second conductors and being magnetized in accordance therewith, a source of electrical pulses of a first polarity connected to said first electrical conductor, and a source of electrical pulses selectively producing pulses of first and second polarities connected to said second electrical conductor, said sources of electrical pulses providing simultaneous pulses to said electrical conductors in time intervals different from said "read" pulses.

4. A magnetic device comprising first and second thin film strips of anisotropic magnetic material, said strips being adapted to receive electrical "read" pulses and to provide electrical signals in accordance with the states of magnetization of said strips in response to said "read" pulses, each strip having a preferred axis of magnetization substantially paralleling the length of the strip, a source of electrical "read" pulses coupled to said strips to produce electric current therein, a first electrical conductor magnetically coupled to said first strip in a first magnetic sense and to said second strip in an opposite magnetic sense and adapted to receive electrical pulses and to produce a first magnetic field in accordance with said pulses, a second electrical conductor magnetically coupled to said first and second magnetic strips in the same magnetic sense and adapted to receive electrical pulses and to produce a second magnetic field in accordance with said pulses, said magnetic strips being responsive to said magnetic fields of said first and second conductors and being magnetized in accordance therewith, a source of electrical pulses of a first polarity connected to said first electrical conductor, and a source of electrical pulses selectively producing pulses of first and second polarities connected to said second electrical conductor, said sources of electrical pulses providing simultaneous pulses to said electrical conductors in time intervals different from said "read" pulses.

5. A magnetic device according to claim 1, in which said first and second thin film strips of anisotropic magnetic material have a thickness greater than the minimum required to exhibit ferromagnetic properties and less than that thickness at which eddy-current losses in said material become significant.

6. A magnetic device according to claim 3, in which said first and second thin film strips of anisotropic magnetic material have a thickness greater than the minimum required to exhibit ferromagnetic properties and less that that thickness at which eddy-current losses in said material become significant.

7. A magnetic device according to claim 3, in which said first and second thin film strips of anisotropic magnetic material have widths below the critical width at which the snap-back effect occurs and in which said "read" pulses contain an amount of energy less than that energy which will cause a change in the states of magnetization of said strips beyond the range of said snap-back effect.

8. A magnetic device comprising first and second thin film strips of anisotropic magnetic material, said strips being adapted to receive electrical pulses and to provide electrical signals in accordance with the states of magnetization of said strips in response to said pulses, each strip having a preferred axis of magnetization substantially paralleling the length of the strip, a plurality of pairs of electrical conductors, each pair including a first electrical conductor magnetically coupled to said first strip in a first magnetic sense and to said second strip in an opposite magnetic sense and a second electrical conductor magnetically coupled to said first and second strips in the same magnetic sense, means coupled to all of said electrical conductors for simultaneously applying electrial pulses thereto to produce magnetization of said magnetic strips in accordance therewith, and a pulse source coupled to both of said strips to produce electric current therein of a magnitude sufficient only to temporarily change the magnetic state of said strip.

9. A magnetic device comprising first and second thin film strips of anisotropic magnetic material, said strips being adapted to receive electrical "read" pulses and to provide electrical signals in accordance with the states of magnetization of said strips in response to said "read" pulses, each strip having a preferred axis of magnetization substantially paralleling the length of the strip, a source of electrical "read" pulses coupled to said strips to produce electric current therein, a first plurality of pairs of electrical conductors, each pair including a first electrical conductor magnetically coupled to said first strip in a first magnetic sense and to said second strip in an opposite magnetic sense and adapted to receive electrical pulses and to produce a first magnetic field in accordance with said pulses, and including a second electrical conductor magnetically coupled to said first and second magnetic strips in the same magnetic sense and adapted to receive electrical pulses and to produce a second magnetic field in accordance with said pulses, said magnetic strips being responsive to said magnetic fields of said first and second conductors and being magnetized in accordance therewith, a source of electrical pulses of a first polarity connected to said first electrical conductor, and a source of electrical pulses selectively producing pulses of first and second polarities connected to said second electrical conductor, said sources of electrical pulses providing simultaneous pulses to said electrical conductors in time intervals different from said "read" pulses.

10. A magnetic device comprising: first and second thin film strips of anisotropic magnetic material having preferred axes of magnetization along the strips;

a first electrical conductor magnetically coupled to both strips for magnetizing one strip in one direction and the other strip in the opposite direction along said preferred axes;

a second electrical conductor magnetically coupled to said strips for magnetizing both strips in the same direction along said preferred axes, said same direction being either said one direction or said opposite direction depending upon the information to be stored;

magnetic pulse source means coupled to said first and said second electrical conductors to simultaneously apply electrical pulses thereto producing magnetization of said magnetic strips in accordance therewith;

and conductive means coupled to said strips for producing magnetic fields in both strips in a direction transverse to said preferred axes of magnetization to change the magnetization of that one of said first and said second magnetic strips which is magnetized.

11. A magnetic device comprising: first and second thin film strips of anisotropic magnetic material having a preferred axes of magnetization along the strips;

a first electrical conductor magnetically coupled to both strips for magnetizing one strip in one direction and the other strip in the opposite direction along said preferred axes;

a second electrical conductor magnetically coupled to said strips for magnetizing both strips in the same direction along said preferred axes;

means coupled to said first electrical conductor for producing magnetizing current in said first conductor;

means coupled to said second electrical conductor for selectively producing magnetizing current therein in one direction or the reverse simultaneously with the production of magnetizing current in said first electrical conductor;

and conductor means coupled to said strips for producing magnetic fields simultaneously in both strips in a direction transverse to said preferred axes of magnetization to rotate the magnetization of that one of said first and said second magnetic strips which is magnetized.

12. A magnetic device comprising: first and second thin film strips of anisotropic magnetic material having a preferred axes of magnetization along the strips;

a first electrical conductor magnetically coupled to both strips for magnetizing one strip in one direction and the other strip in the opposite direction along said preferred axes;

a second electrical conductor magnetically coupled to said strips for magnetizing both strips in the same direction along said preferred axes;

means coupled to said first electrical conductor for producing magnetizing current in said first conductor;

means coupled to said second electrical conductor for selectively producing magnetizing current therein in one direction or the reverse simultaneously with production of magnetizing current in said first electrical conductor;

conductor means coupled to said strips for producing magnetic fields simultaneously in both strips in a direction transverse to said preferred axes of magnetization to rotate the magnetization of that one of said first and said second magnetic strips which is magnetized;

and means coupled to and responsive to electric currents induced in said second electrical conductor in response to said change of magnetization of one of said two strips.

No references cited.

IRVING L. SRAGOW, *Primary Examiner.*